United States Patent
Guo et al.

(10) Patent No.: US 12,126,705 B2
(45) Date of Patent: Oct. 22, 2024

(54) METHOD OF REAL-TIME HIGH-SPEED QUANTUM RANDOM NUMBER GENERATION BASED ON CHAOS AMPLIFYING QUANTUM NOISE

(71) Applicant: Taiyuan University of Technology, Shanxi Province (CN)

(72) Inventors: Xiaomin Guo, Shanxi Province (CN); Jiangjiang Zhang, Shanxi Province (CN); Yanqiang Guo, Shanxi Province (CN)

(73) Assignee: Taiyuan University of Technology, Taiyuan (CN)

( * ) Notice: Subject to any disclaimer, the term of this patent is extended or adjusted under 35 U.S.C. 154(b) by 693 days.

(21) Appl. No.: 17/337,689

(22) Filed: Jun. 3, 2021

(65) Prior Publication Data

US 2021/0385064 A1    Dec. 9, 2021

(30) Foreign Application Priority Data

Jun. 3, 2020    (CN) .......................... 202010493696.1
Apr. 30, 2021  (CN) .......................... 202110485448.7

(51) Int. Cl.
*G06F 7/58*         (2006.01)
*H04B 10/70*     (2013.01)
(Continued)

(52) U.S. Cl.
CPC ............... *H04L 9/001* (2013.01); *G06F 7/58* (2013.01); *H04B 10/70* (2013.01); *H04L 9/0852* (2013.01); *H04L 9/0869* (2013.01)

(58) Field of Classification Search
CPC ................................... G06F 7/588; G06F 7/58
(Continued)

(56) References Cited

FOREIGN PATENT DOCUMENTS

CN    109388374 A  *  2/2019   ............. G06F 7/588

OTHER PUBLICATIONS

Adsantec, Understanding The Difference Between Power Splitters And Power Dividers (Year: 2018).*
(Continued)

*Primary Examiner* — Tan V Mai
(74) *Attorney, Agent, or Firm* — Thomas | Horstemeyer, LLP

(57) ABSTRACT

A bottleneck in the continuous-variable quantum random number generation rate is mainly as follows: low quantum entropy content in actual quantum measurement on quantum entropy source, and low real-time post-processing rate in extraction of true random numbers. Therefore, the present disclosure aims to provide a method of real-time high-speed quantum random number generation based on chaos amplifying quantum noise, to greatly increase the quantum entropy content through the chaos amplifying quantum noise, perform parallel implementation of universal Hash post-processing of multichannel quantum random numbers, and implement real-time high-speed quantum random number generation. The present disclosure provides a cost-effective, highly scalable, and highly integrated entropy-increase scheme for device-independent, semi-device-independent, and device-trusted quantum random number generators that use continuous-variable quantum noise as an entropy source, effectively promoting the application of the continuous-variable quantum random number generators.

5 Claims, 5 Drawing Sheets

(51) Int. Cl.
  *H04L 9/00*  (2022.01)
  *H04L 9/08*  (2006.01)
(58) Field of Classification Search
  USPC .......................................................... 708/251
  See application file for complete search history.

(56) References Cited

OTHER PUBLICATIONS

Guo, Cheng, Wu, Gao, Li, and Guo Parallel real-time quantum random number generator, version 1 (Year: 2019).*
Thorlabs, PDB48XC-AC version 1.6 manual, via manualslib (Year: 2019).*
"Homodyne." Merriam-Webster.com Dictionary, Merriam-Webster, https://www.merriam-webster.com/dictionary/homodyne. Accessed Jan. 25, 2024. (Year: 2024).*
"Zero beat." Merriam-Webster.com Dictionary, Merriam-Webster, https://www.merriam-webster.com/dictionary/zero%20beat. Accessed Jan. 25, 2024. (Year: 2024).*
Jeffrey H. Shapiro and Asif Shakeel, "Optimizing homodyne detection of quadrature-noise squeezing by local-oscillator selection," J. Opt. Soc. Am. B 14, 232-249 (Year: 1997).*
Li, Dengwen & Huang, Peng & Zhou, Yingming & Li, Yuan & Zeng, Guihua. Memory-Saving Implementation of High-Speed Privacy Amplification Algorithm for Continuous-Variable Quantum Key Distribution. IEEE Photonics Journal. 10. 1-1. 10.1109/JPHOT.2018.2865486. (Year: 2018).*
Guo, Liu, Guo, Cheng, and Li, Chinese patent application 109388374, Based On A Quantum Chaotic amplifying Noise Of Random Number Generating Method, translated by Clarivate Analytics (Year: 2019).*

* cited by examiner

METHOD OF REAL-TIME HIGH-SPEED QUANTUM RANDOM NUMBER GENERATION BASED ON CHAOS AMPLIFYING QUANTUM NOISE

CROSS REFERENCE TO RELATED APPLICATION(S)

This patent application claims the benefit and priority of Chinese Patent Application No. 202010493696.1, filed on Jun. 3, 2020, and Chinese Patent Application No. 202110485448.7, filed on Apr. 30, 2021, the disclosures of which are incorporated by reference herein in their entirety as part of the present application.

TECHNICAL FIELD

The present disclosure relates to a quantum random number generator, and more specifically, to a method of real-time high-speed quantum random number generation based on chaos amplifying quantum noise.

BACKGROUND ART

With the advent of the information age, information security has been closely related to our lives, and has received growing attention from states and governments. Therefore, a high-quality encryption method that is difficult to be decrypted by a decipher has become a research hotspot in the world. In such a context, random numbers have been widely used, and there is increasing research on random number generators. True random numbers, in particular, have attracted the attention of scholars in the field of cryptography due to the advantages of unpredictability, non-replicability and non-renewability. In recent decades, many countries have made important progress in quantum key distribution schemes proposed based on the uncertainty principle and quantum unclonability, achieved great results in research of related fields, and established respective quantum secure communication networks. In the quantum key distribution scheme, information-theoretic provability of an entire system guarantees communication security. To ensure the information-theoretic provability of the system's security, randomness of random numbers used to generate a key must be information-theoretically provable. It is the safest solution for both parties to have their own local true random number generators.

The most significant feature of quantum random numbers is the information-theoretically provable randomness. The randomness of quantum random numbers is based on the uncertainty nature of quantum physics. During actual quantum secure communication, secure random numbers need to have information-theoretically provable randomness, as well as an ability to guard against attackers. Therefore, the research and application of quantum random number generators are particularly important. Compared with classical noise, quantum noise should dominate. Because only when the proportion of quantum noise in the detected signals is high enough, the security and the quantum random bit generation rate of the random number generator can be ensured. In addition, during the generation of quantum random numbers, raw data from quantum measurements needs to be post-processed to prevent eavesdropping based classical noise or quantum side information. So far, there have been various ways to post-process random numbers. Universal Toeplitz hashing is a post-processing method with information-theoretically provable security. Aiming at the application of quantum random number generator, there is an urgent need for a method to achieve real-time high-speed quantum random number generation.

SUMMARY

In view of the shortcomings of the prior art, the present disclosure aims to provide a method of real-time high-speed quantum random number generation based on chaos amplifying quantum noise. The present disclosure proposes to generate true random sequences based on chaos amplifying quantum noise, perform parallel implementation of universal Hash post-processing of multichannel quantum random numbers, and implement real-time high-speed quantum random number generation.

To achieve the above objective, the present disclosure provides the following technical solutions.

A method of real-time high-speed quantum random number generation based on chaos amplifying quantum noise is provided. Based on chaos amplifying quantum noise, true random entropy content in a quantum entropy source measurement can be increased significantly, perform extraction of several chaotic quantum entropy sub-sources and universal Hash post-processing on raw random numbers in parallel, and implement real-time high-speed generation of quantum random numbers. The method specifically includes the following steps:

step 1. generating a chaotic light field based on an external cavity feedback laser: a laser beam emitted by a DFB laser sequentially passes through a polarization controller, a circulator, a 50/50 fiber coupler, a tunable attenuator, an optical isolator, and a fiber filter to form a chaotic laser beam, and the chaotic laser beam is transformed into a spatial light beam through a first fiber collimator, which then enters a first optical polarization beam splitter through a first half-wave plate;

step 2. establishing a balanced homodyne detection system, and extracting quadrature fluctuation noise of high-frequency quantum modes of the chaotic laser field as entropy source for generating quantum random numbers: after passing through a series of optical devices, a single-mode continuous-wave laser beam emitted by a semiconductor laser is coherently coupled with the chaotic laser beam emitted by the DFB laser at a second optical polarization beam splitter, and the laser beam from the semiconductor laser serves as the local oscillator for balanced homodyne detection; extracting quadrature fluctuations of several high-frequency sideband modes of the quantum state of the chaotic laser field as sub-entropy-sources for generating quantum random numbers: two photocurrent signals converted by two photodetectors in a balanced photodetector are subtracted by a subtractor, the resulting signal is divided into several parts by a power divider and output, radio frequency signals generated by radio frequency signal generators and the photocurrent signals output by the power divider are frequency-mixed at respective frequency mixer, signals output by the frequency mixer are filtered by respective low-pass filters, and resulting photocurrent signals are converted into digital signals by respective analog-to-digital converters to obtain raw random number sequences from the entropy sub-sources;

step 3. based on the parallel computing feature of field programmable gate arrays (FPGAs), creating universal Hash extractors for the raw random numbers from each sub-entropy source in a single FPGA to extract quantum random numbers in parallel: based on the parallel processing feature of the FPGA, a large matrix operation is split into several small matrix operations, a buffer is used at an outer layer to drive clock signals of each module, and a two-layer parallel pipeline algorithm is designed on the basis of coordinating logical resources and clock signals, where clocks for the analog-to-digital converter and clocks for the real-time and parallel processing in the FPGA are uniformly controlled by a built-in clock; and random numbers output from these extractors are mixed alternately per 16 bits, and the final random number sequence is transmitted to a computer through a PCI-E interface in real time. quantum random numbers generated in real time based on the chaos amplifying quantum noise are obtained.

Further, in step 1, the 50/50 fiber coupler splits the laser beam into two beams: one beam is fed back into a laser cavity through the tunable attenuator, a wideband chaotic laser beam is formed by adjusting the intensity of the fed-back laser by the attenuator, and the other beam passes through the optical isolator to ensure unidirectional transmission of the formed chaotic laser; and chaotic system output is controlled by driving current intensity, feedback delay time, and feedback intensity.

Further, in step 2, a light beam of the single-mode continuous-wave laser beam that is transmitted through a second half-wave plate and enters the first optical polarization beam splitter serves as the local oscillator for balanced homodyne detection, and then enters the second optical polarization beam splitter after the polarization direction is adjusted by a third half-wave plate; P light parallel to an optical path plane and S light perpendicular to the optical path plane are transmitted out, are respectively coupled into a second fiber collimator and a third fiber collimator after interference-based mode selection, and then enter the two photodetectors; the optical signals are converted into photocurrent signals, with the gains amplified to a macro level, two photocurrent signals are subtracted by a subtractor; fluctuations of a resulting difference signal are in proportion to the quadrature fluctuations of high-frequency quantum modes of nonlinear chaos amplifying shot noise, component, with definite frequency and polarization, of the chaotic light field is selected.

Further, based on two-layer parallel pipeline algorithm, implement Toeplitz Hash post-processing on several sets of raw random bits sourced from several different quantum sideband modes; at the outer layer, Toeplitz extractors for these sub-entropy sources are constructed independently and run simultaneously; at an inner layer, real-time Toeplitz post-processing is implemented through the pipeline algorithm for each quantum sideband mode.

Further, the two-layer parallel pipeline algorithm includes modules at three levels: a Toeplitz sub-matrix generation module at level 1 is configured to construct a Toeplitz sub-matrix in each clock cycle, and use a shift feedback register to update the Toeplitz sub-matrix in each clock cycle; a Toeplitz sub-matrix operation module at level 2 performs computation for a single sub-matrix; and a vector register exclusive-OR module at level 3 obtains a processing result of the single sub-matrix and stores the result in a register.

In summary, the present disclosure has the following beneficial effects:

(1) The chaos amplifying quantum noise significantly increases the quantum noise entropy content of a quantum random number generating system, which can greatly improve the robustness and true random number extraction ratio of the quantum random number generation system, obviously advantageous over the previous continuous-variable quantum random number generators.

(2) By extracting quadrature fluctuations of several high-frequency quantum modes of the chaotic laser field as entropy sources to implement parallel generation of quantum random numbers, the present disclosure provides a cost-effective, highly scalable, and highly integrated quantum random number generation scheme, effectively promoting the application of continuous-variable quantum random number generators.

(3) The present invention proposes to fully utilize the parallel computing feature of the logic operation hardware units in the quantum random number post-processing part, and perform parallel implementation of universal Hash post-processing of several quantum random number sequences, increasing the real-time quantum random number generation rate to above 10 Gbps.

(4) The continuous-variable quantum random number generator has a promising prospect due to its information-theoretically provable security and the high bandwidth, strong robustness, and chipability of the detection system.

In the figures, 1. DFB laser, 2. polarization controller, 3. circulator, 4. 50/50 fiber coupler, 5. tunable attenuator, 6. optical isolator, 7. fiber filter, 8. first fiber collimator, 9. first half-wave plate, 10. semiconductor laser, 11. second half-wave plate, 12. first optical polarization beam splitter, 13. third half-wave plate, 14. second optical polarization beam splitter, 15. second fiber collimator, 16. first photodetector, 17. third fiber collimator, 18. second photodetector, 19. subtractor, 20. power divider, 21. radio frequency signal generator, 22. frequency mixer, 23. low-pass filter, 24. analog-to-digital converter, 25. field programmable gate array, and 26. PCI-E interface.

DETAILED DESCRIPTION OF THE EMBODIMENTS

The present disclosure will be explained in detail with reference to the accompanying drawings.

Figure 1:
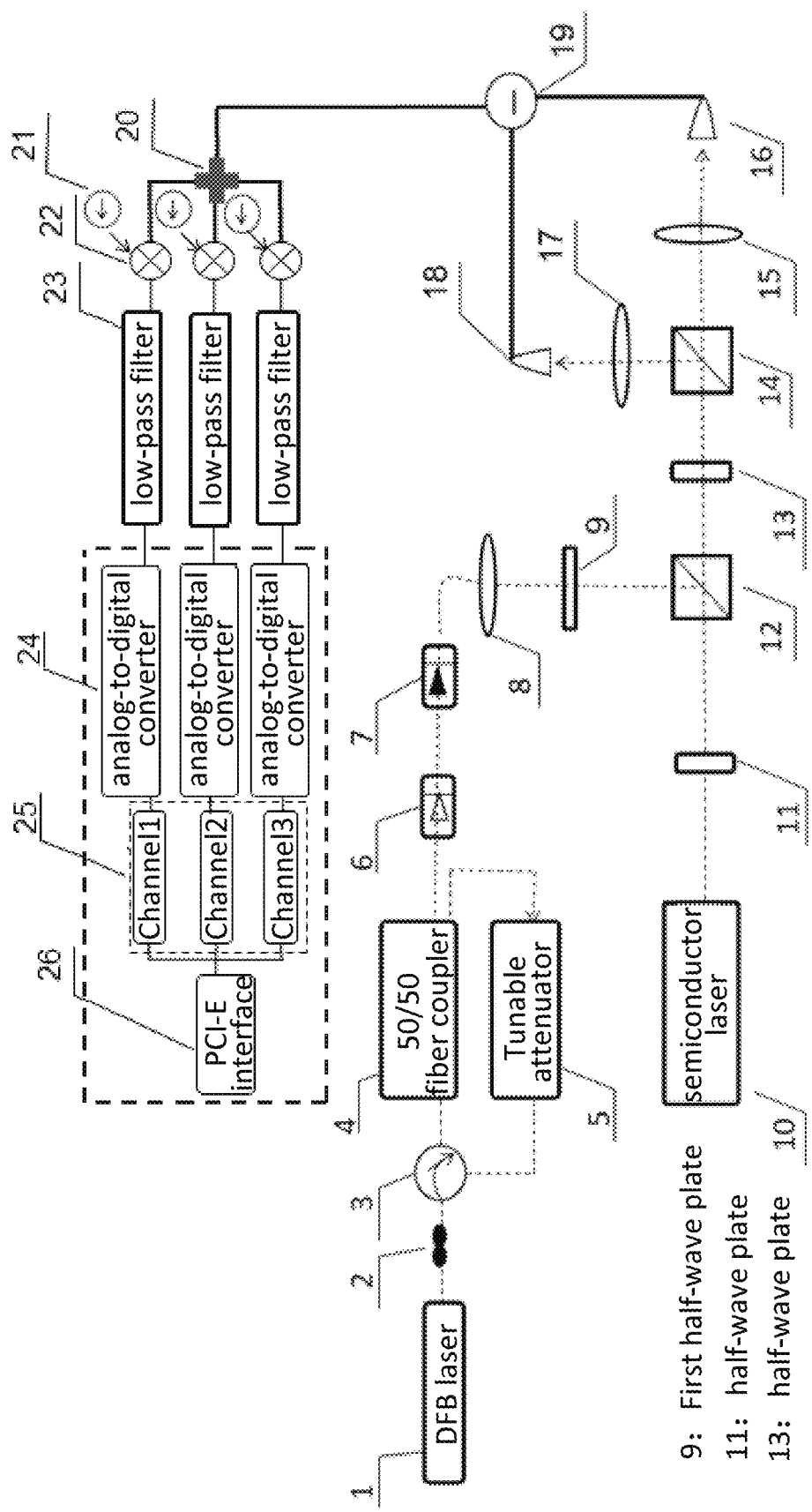
FIG. 1 is a schematic connection diagram of the present disclosure, where a dashed line represents an optical connection and a solid line represents an electrical connection.
Figure 2:
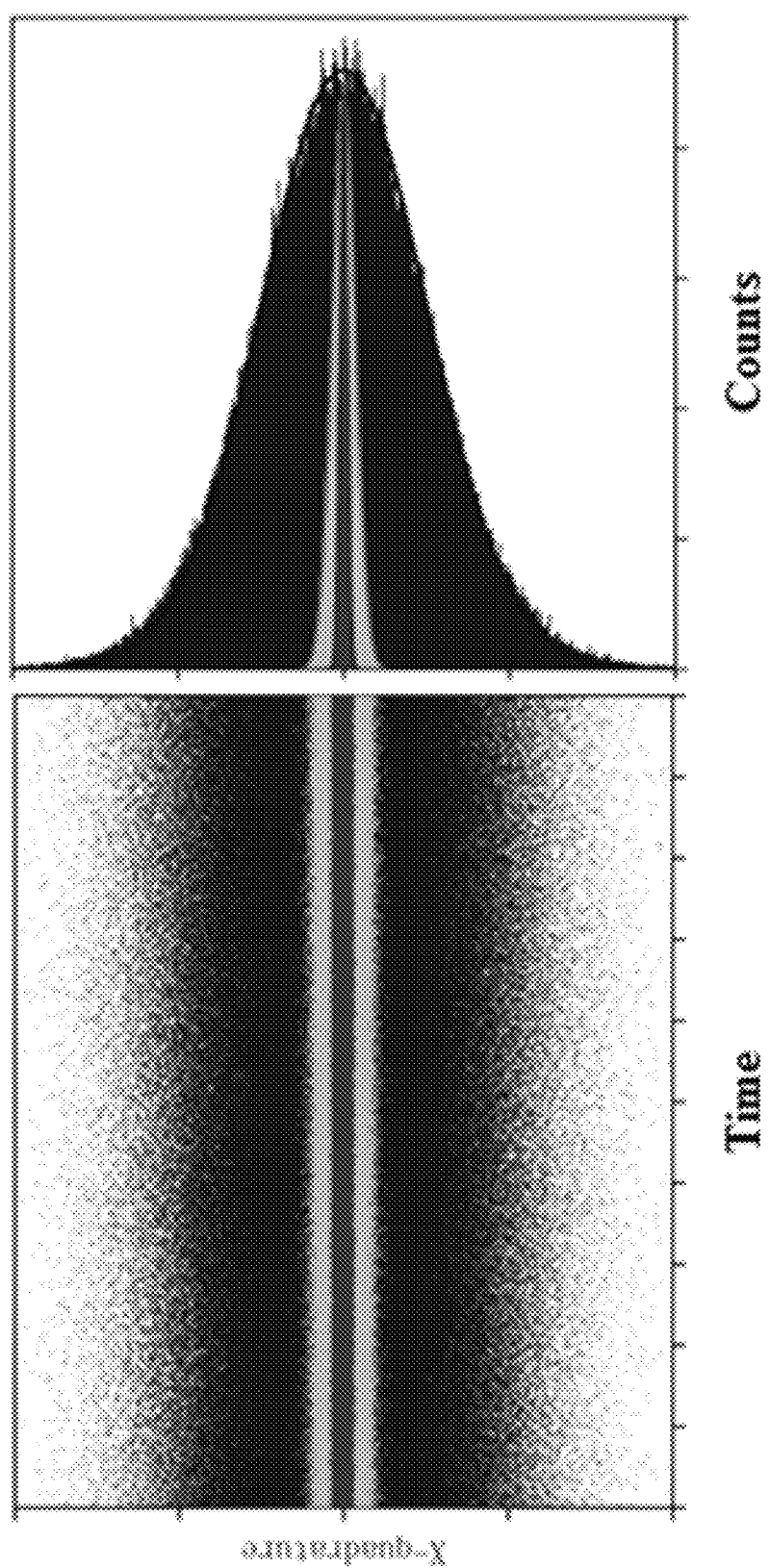
FIG. 2 is a schematic diagram for determining initial-state noise distribution of a system.
Figure 3:
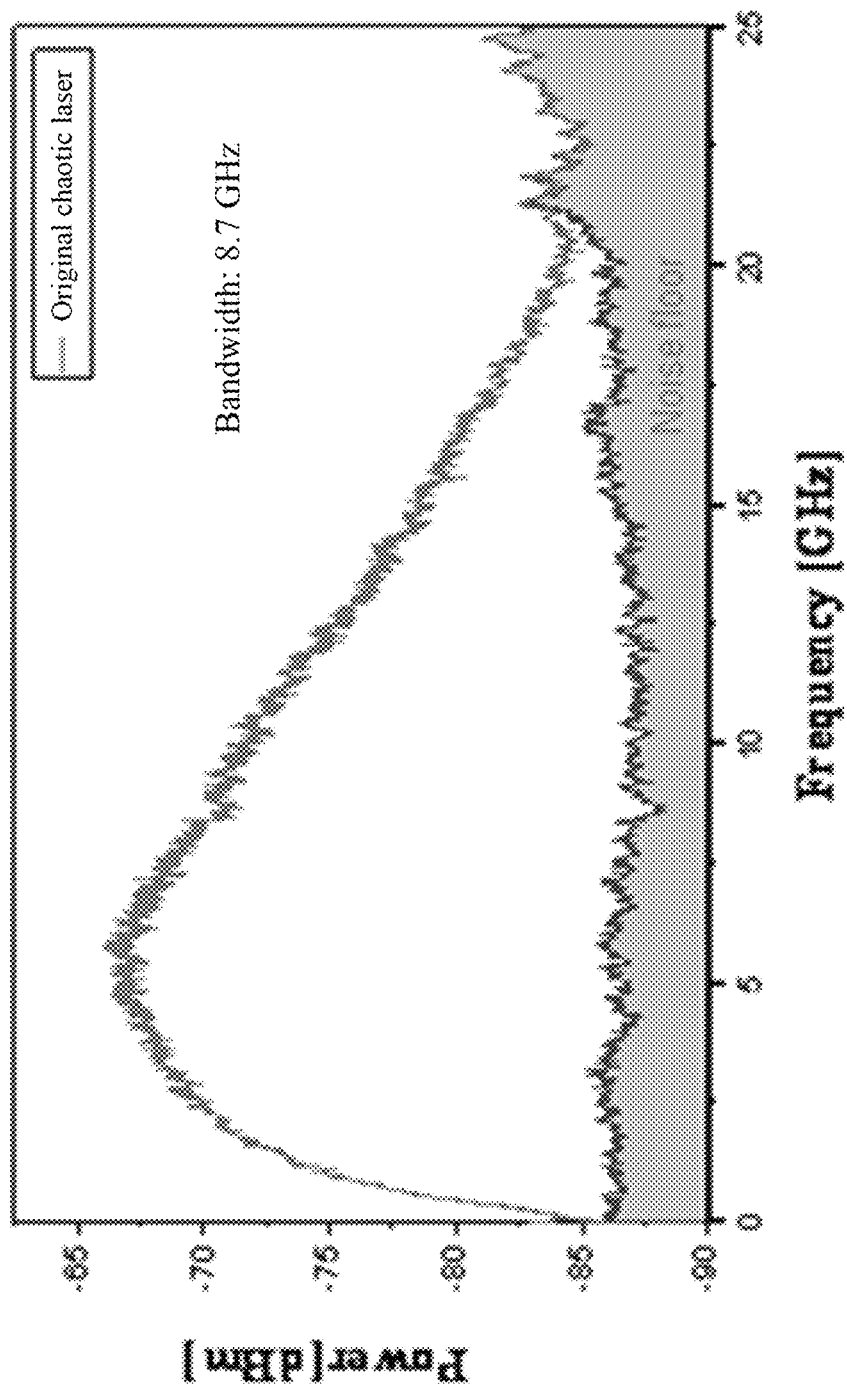
FIG. 3 is a spectrum diagram of raw chaotic signals detected by a photodetector.
Figure 4:
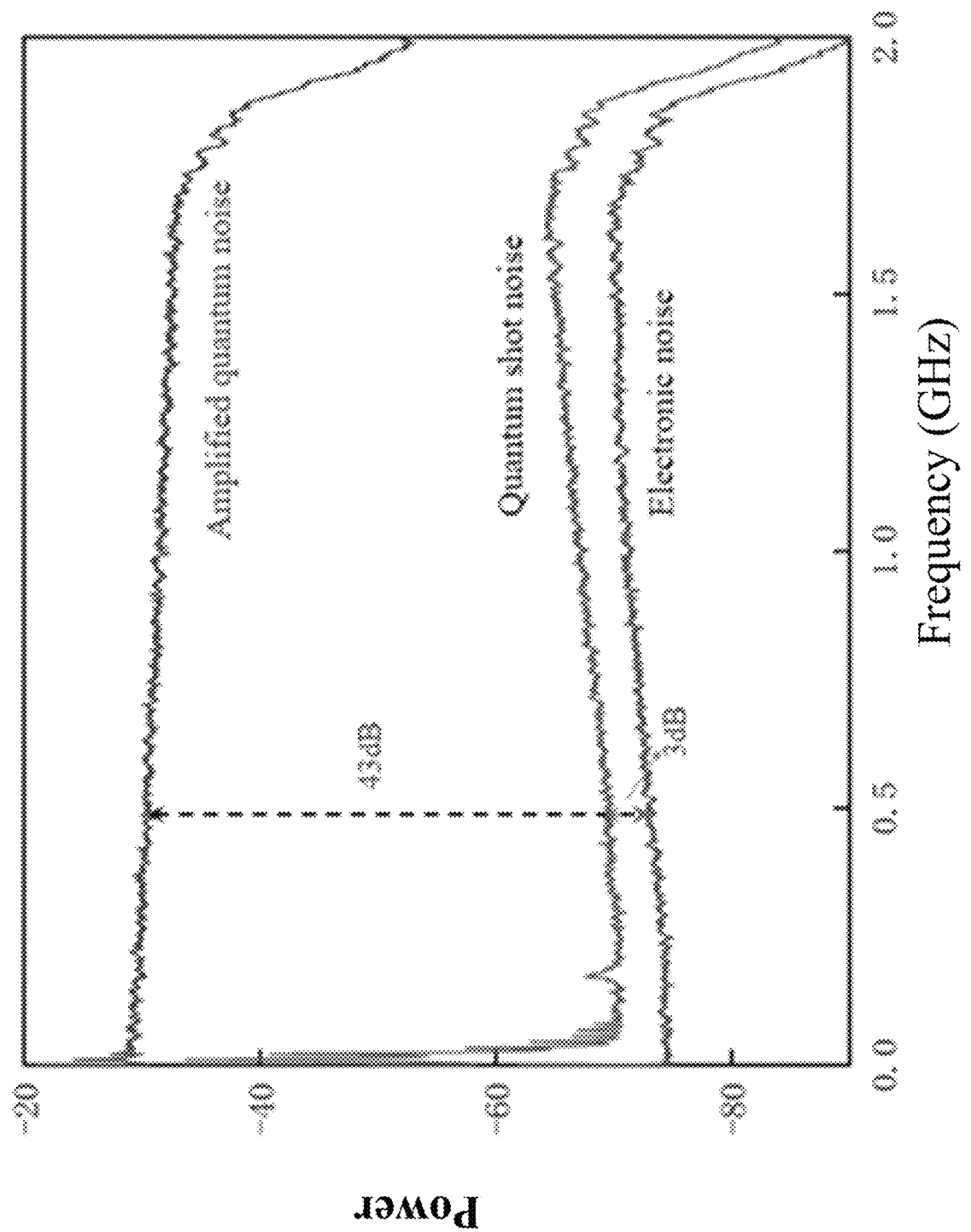
FIG. 4 is a spectrum diagram of chaos amplifying quantum noise measured by a balanced homodyne detection system.
Figure 5:
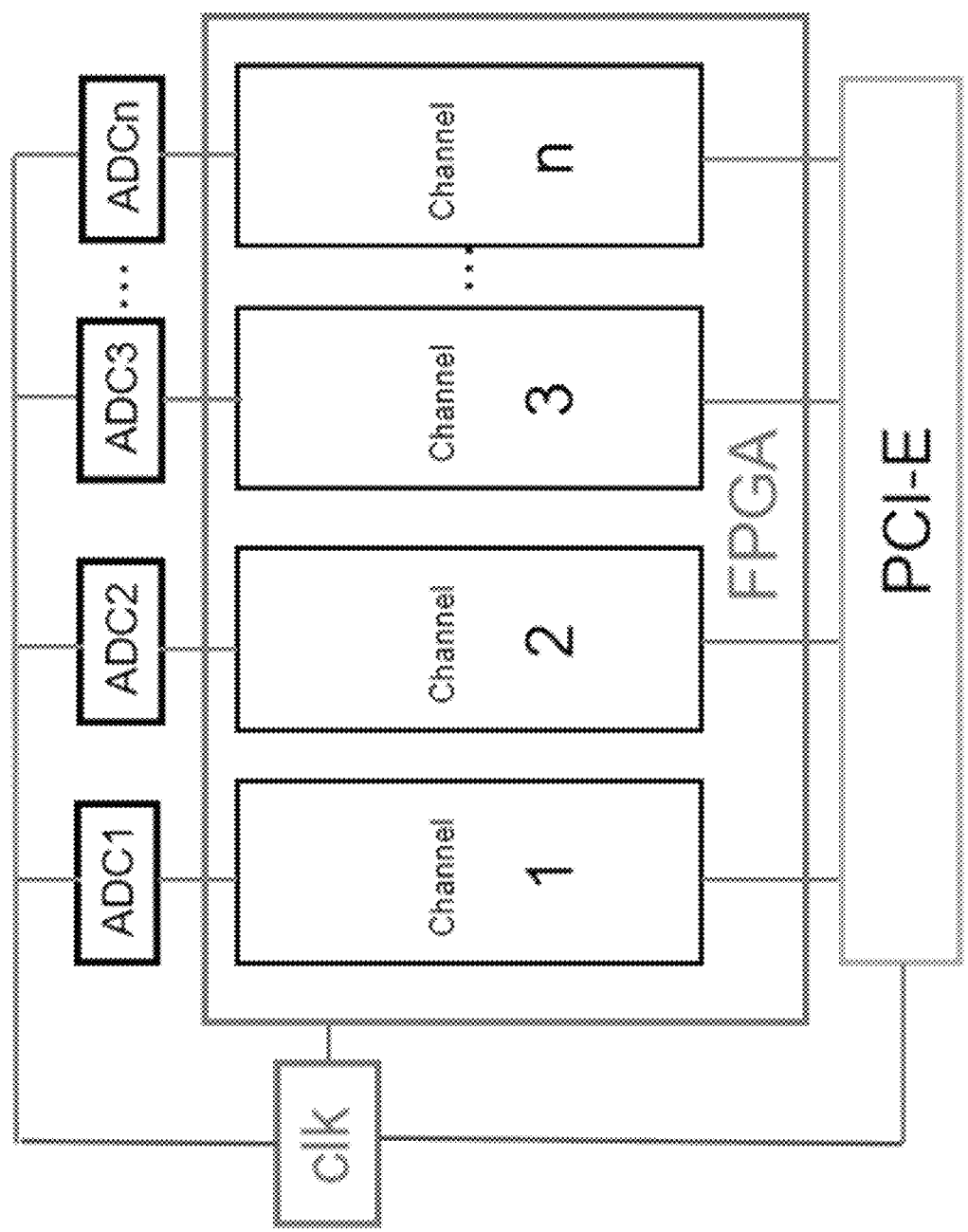
FIG. 5 is a diagram shows a two-layer parallel structure for Toeplitz post-processing.

As shown in FIG. 1 to FIG. 5, the present disclosure proposes to amplify quantum shot noise based on chaos sensitivity, extract high-frequency quantum modes of chaotic laser field as an entropy source through balanced homodyne detection, and increase quantum noise entropy content of a continuous-variable quantum random number generator, thereby improving the security and real-time random number generation rate. Further, several high-frequency quantum modes at different center frequencies within the balanced homodyne detection bandwidth are extracted in parallel as entropy sub-source to generate random numbers in parallel, thereby implementing a highly secure, robust, and scalable random number generation scheme.

Taking a three-channel parallel quantum random number generator as an example, the method specifically includes the following steps.

Step 1. Generate a chaotic light field based on an external cavity feedback laser: A DFB laser 1 is a single-mode laser with a center wavelength of 1550 nm. A laser beam with a center wavelength of 1550 nm emitted by the DFB laser 1 sequentially passes through a polarization controller 2, a circulator 3, a 50/50 fiber coupler 4, a tunable attenuator 5, an optical isolator 6, and a fiber filter 7 to form a chaotic laser beam. The polarization controller 2 controls a polarization state of the beam to make a feedback light beam parallel to a polarization direction of the laser beam, so as to achieve the best coupling. The 50/50 fiber coupler 4 divides the laser beam into two beams: one laser beam is fed back into a laser cavity through the tunable attenuator 5, a Thorlabs-VOA50-APC attenuator with a center wavelength of 1550 nm, a wideband chaotic laser beam is formed by adjusting intensity through the attenuator 5; and the other laser beam passes through the optical isolator 6 to ensure unidirectional transmission of the established chaotic laser beam. The optical fiber filter 7 is a BPF-1X1 filter with a center wavelength of 1550.12 nm and a bandwidth of 0.5 nm. The chaotic laser passes through the optical fiber filter 7 and a first fiber collimator 8, and is transformed into a spatial light beam, which enters a first optical polarization beam splitter 12 through a first half-wave plate 9.

Step 2. Establish a balanced homodyne detection system, and extract quadrature fluctuations of high-frequency quantum modes of the chaotic laser field as entropy sources for generating true random numbers: A semiconductor laser 10 is an LD-TC40 semiconductor laser 50 with a center wavelength of 1550 nm. The semiconductor laser 10 emits a single-mode continuous-wave laser beam with a center wavelength of 1550 nm. A light beam that is transmitted through a second half-wave plate 11 and enters the first optical polarization beam splitter 12 has its polarization direction adjusted by a third half-wave plate 13, and then enters a second optical polarization beam splitter 14. P light parallel to an optical path plane and S light perpendicular to the optical path plane are transmitted out, are respectively coupled into a second fiber collimator 15 and a third fiber collimator 17 after interference-based mode selection, and then enter a pair of balanced photodetectors with high quantum efficiency and symmetric performance, namely a first photodetector 16 and a second photodetector 18. The two photocurrent signals converted by the two photodetectors are subtracted by a subtractor 19, and fluctuations of a resulting difference signal are in proportion to quadrature fluctuations of a high-frequency quantum mode, which is established based on chaos nonlinear amplification of shot noise. The single-mode continuous-wave laser beam passes through a series of optical device and is coherently coupled with the laser beam emitted by the DFB laser 1 at the second optical polarization beam splitter 14. In a chaos amplification mechanism, both the low-frequency classical noise and the wideband shot noise are amplified to a macro level, so that quantum random numbers can be extracted from the quantum entropy source based on the chaos amplifying quantum noise.

Extract quadrature fluctuations of three high-frequency sideband quantum modes from the chaotic laser beam as entropy sub-sources for generating quantum random numbers: The two photocurrent signals converted by the two photodetectors, namely the first photodetector 16 and the second photodetector 18, are subtracted by the subtractor 19, and the resulting signal is then divided into three parts by a power divider 20 and output; radio frequency signals with different frequencies generated by radio frequency signal generators and the three photocurrent signals output by the power divider are frequency-mixed at respective frequency mixers 22, signals output by the frequency mixers 22 are filtered by respective low-pass filters 23 with a determined bandwidth, and resulting photocurrent signals are converted into digital signals by respective analog-to-digital converters 24 to obtain raw random numbers from the entropy sub-sources. Photoelectric signal in each sideband frequency mode is sampled by an analog-to-digital converter, and in an offline state, statistical characteristics are analyzed to strictly evaluate the conditional minimum entropy from each quantum sub-entropy source in the raw data, to provide an extraction ratio of quantum random numbers for each Toeplitz Hash extractor.

Step 3. In the post-processing stage, based on the parallel computing feature of FPGAs, construct Toeplitz random number extractors for three entropy sub-sources in a single FPGA, post-process raw random numbers from different entropy sub-sources in parallel, and merge the results for output. Through overall planning of FPGA logic resources, construct a real-time high-speed post-processing module. In an integrated software environment (ISE), the foregoing design is completed in a 7k325t-fbg676 FPGA. Operations in an FPGA 25 are usually implemented through a look-up table (LUT). A large-matrix operation consumes a lot of LUTs. Therefore, a large matrix operation is split into several small matrix operations, and a buffer is used at the outer layer to drive clock signals of each module, so as to design a two-layer parallel pipeline algorithm on the basis of accurately coordinating logical resources and clock signals. The two-layer parallel pipeline algorithm realizes Toeplitz Hash post-processing of several sets of raw random bits in several different quantum sideband modes. At the outer layer, Toeplitz extractors for several entropy sub-sources are constructed independently and run simultaneously; at an inner layer, real-time Toeplitz post-processing is implemented through the pipeline algorithm for each quantum sideband mode. The two-layer parallel pipeline algorithm includes modules at three levels: a Toeplitz sub-matrix generation module at level 1 is configured to construct a Toeplitz sub-matrix in each clock cycle, and use a shift feedback register to update the Toeplitz sub-matrix in each clock cycle; a Toeplitz sub-matrix operation module at level 2 performs computation for a single sub-matrix; and a vector register exclusive-OR module at level 3 obtains a processing result of the single sub-matrix and stores the result in a register. Clocks for the analog-to-digital converter 24 and the clocks for parallel real-time post-processing in the FPGA 25 are uniformly controlled by a built-in clocksampling and randomness extracting of the raw data with information-theoretically provable security are implemented synchronously, ensuring real-time high-speed quantum true random number generation. The random numbers output by the three channels are mixed alternately per 16 bits, and results are transmitted to a computer through a PCI-E interface 26 in real time. In this way, quantum random numbers generation in real time based on the chaos amplifying quantum noise is realized. The ADC and FPGA hardware resources are fully utilized to realize the real-time high-speed quantum random number generation.

In the present disclosure, the three half-wave plates are FBR-AH3 achromatic half-wave plates with a wavelength ranging from 1100 nm to 2000 nm, the two polarization beam splitters are 50/50 FBT-PBS054 polarization beam splitter with a wavelength ranging from 620 nm to 1600 nm, the radio frequency signal generator 20 is a 600 MHz HP8648A radio frequency signal generator, the balanced photodetector is a 1.6 GHz PDB480C-AC balanced photodetector, the low-pass filter 23 is a 550 MHz BLP-550+ low-pass filter, and the FPGA 25 is an xc7k325t-2ffg676 chip.

The foregoing descriptions are only preferred implementations of the present disclosure, and the scope of the present disclosure is not limited to the foregoing embodiments. All technical solutions based on the idea of the present disclosure fall within the protection scope of the present disclosure. It should be noted that those of ordinary skill in the art can make several improvements and modifications without departing from the principles of the present disclosure. These improvements and modifications should also be considered as falling within the protection scope of the present disclosure.

What is claimed is:

1. A method of real-time parallel quantum random number generation based on chaos amplifying quantum noise, comprising the following steps:
    step 1: generating a chaotic laser beam based on an external cavity feedback laser, wherein a laser beam emitted by a DFB laser (1) sequentially passes through a polarization controller (2), a circulator (3), and a 50/50 fiber coupler (4), the 50/50 fiber coupler (4) splits the laser beam into two beams, one beam is fed back into a laser cavity through the tunable attenuator (5), and the other beam passes through an optical isolator (6) and a fiber filter (7) to form a chaotic laser beam, and the chaotic laser beam is transformed into a spatial light beam through a first fiber collimator (8), which then enters a first optical polarization beam splitter (12) through a first half-wave plate (9);
    step 2: establishing a balanced homodyne detection system, and extracting quadrature fluctuations of a sideband quantum mode of the chaotic laser beam as the entropy source for generating quantum random numbers, wherein a single-mode continuous-wave laser beam emitted by a semiconductor laser (10) passes through a series of optical devices and is coherently coupled with the laser beam emitted by the DFB laser (1) at a second optical polarization beam splitter (14), and the laser beam from the semiconductor laser serves as local oscillator for balanced homodyne detection; and extracting quadrature fluctuations of several sideband modes of the quantum state of the chaotic laser beam as sub-entropy-sources for generating quantum random numbers, wherein two photocurrent signals converted by two photodetectors in a balanced photodetector are subtracted by a subtractor (19), the resulting signal is divided into several parts by a power divider (20) for output, radio frequency signals generated by radio frequency signal generators (21) and the photocurrent signals generated by the power divider are frequency-mixed at respective frequency mixer (22), signals output by the frequency mixer (22) are filtered by respective low-pass filters (23), in each path, filtered photocurrent signal is converted into digital signal by respective analog-to-digital converter (24) to obtain raw random numbers from the entropy sub-sources; wherein there are no radio frequency amplifiers connected to the power divider (20); and
    step 3: based on the parallel computing feature of the field programmable gate arrays (FPGA), creating a universal Hash extractor for raw random numbers from each entropy sub-source in a single FPGA to extract quantum random numbers in parallel, wherein based on the parallel processing feature of the FPGAs (25), a large matrix operation is split into several small matrix operations, and a buffer is used at an outer layer to drive clock signals of each module, so as to design a two-layer parallel pipeline algorithm on the basis of coordinating logical resources and clock signals, wherein clocks for the analog-to-digital converter (24) and clocks for the parallel post-processing in real time in the FPGA (25) are uniformly controlled by a built-in clock; and random numbers output by these channels are mixed alternately per 16 bits, and results are transmitted to a computer through a PCI-E interface (26) in real time, to realized real-time quantum random numbers generation based on chaos amplifying quantum noise;
    wherein the two-layer parallel pipeline algorithm comprises modules at three levels: a Toeplitz sub-matrix generation module at level 1 is configured to construct a Toeplitz sub-matrix in each clock cycle, and use a shift feedback register to update the Toeplitz sub-matrix in each clock cycle; a Toeplitz sub-matrix operation module at level 2 performs computation for a single sub-matrix; and a vector register exclusive-OR module at level 3 obtains a processing result of the single sub-matrix and stores the result in a register.

2. The method of real-time parallel quantum random number generation based on chaos amplifying quantum noise according to claim 1, wherein in step 1, a wideband chaotic laser beam is formed by adjusting the feedback intensity through the attenuator (5), and chaotic system output is realized by controlling drive current intensity, feedback delay time, and feedback intensity.

3. The method of real-time parallel quantum random number generation based on chaos amplifying quantum noise according to claim 1, wherein in step 2, a light beam of the single-mode continuous-wave laser beam that is transmitted through a second half-wave plate (11) and enters the first optical polarization beam splitter (12) serves as the local oscillator for balanced homodyne detection, and then enters the second optical polarization beam splitter (14) after its polarization direction is adjusted by a third half-wave plate (13); P light parallel to an optical path plane and S light perpendicular to the optical path plane are transmitted out, are respectively coupled into a second fiber collimator (15) and a third fiber collimator (17) after interference-based mode selection, and then enter the two photodetectors;
    the optical signals are converted into photocurrent signals, and the photocurrent signals are amplified, two photocurrent signal are subtracted by a subtractor (19); fluctuations of a resulting difference signal are in proportion to the quadrature fluctuations of a sideband quantum mode constructed based on nonlinear chaos amplifying shot noise, and frequency and polarization components of the chaotic laser beam are selected.

4. The method of real-time parallel quantum random number generation based on chaos amplifying quantum noise according to claim 1, wherein the two-layer parallel pipeline algorithm, Toeplitz Hash post-processing on several sets of raw random bits in several different quantum sideband modes is implemented; at the outer layer, Toeplitz extractors of several entropy sub-sources are constructed independently and run simultaneously; at an inner layer, real-time Toeplitz post-processing is implemented through the pipeline algorithm for each quantum sideband mode.

5. The method of real-time parallel quantum random number generation based on chaos amplifying quantum noise according to claim 4, wherein the two-layer parallel pipeline algorithm comprises modules at three levels: a Toeplitz sub-matrix generation module at level 1 is configured to construct a Toeplitz sub-matrix in each clock cycle, and use a shift feedback register to update the Toeplitz sub-matrix in each clock cycle; a Toeplitz sub-matrix operation module at level 2 performs computation for a single sub-matrix; and a vector register exclusive-OR module at level 3 obtains a processing result of the single sub-matrix and stores the result in a register.

\* \* \* \* \*